Oct. 20, 1925.
E. I. WALLACE
FLY SCREEN
Filed April 7, 1924
1,557,909
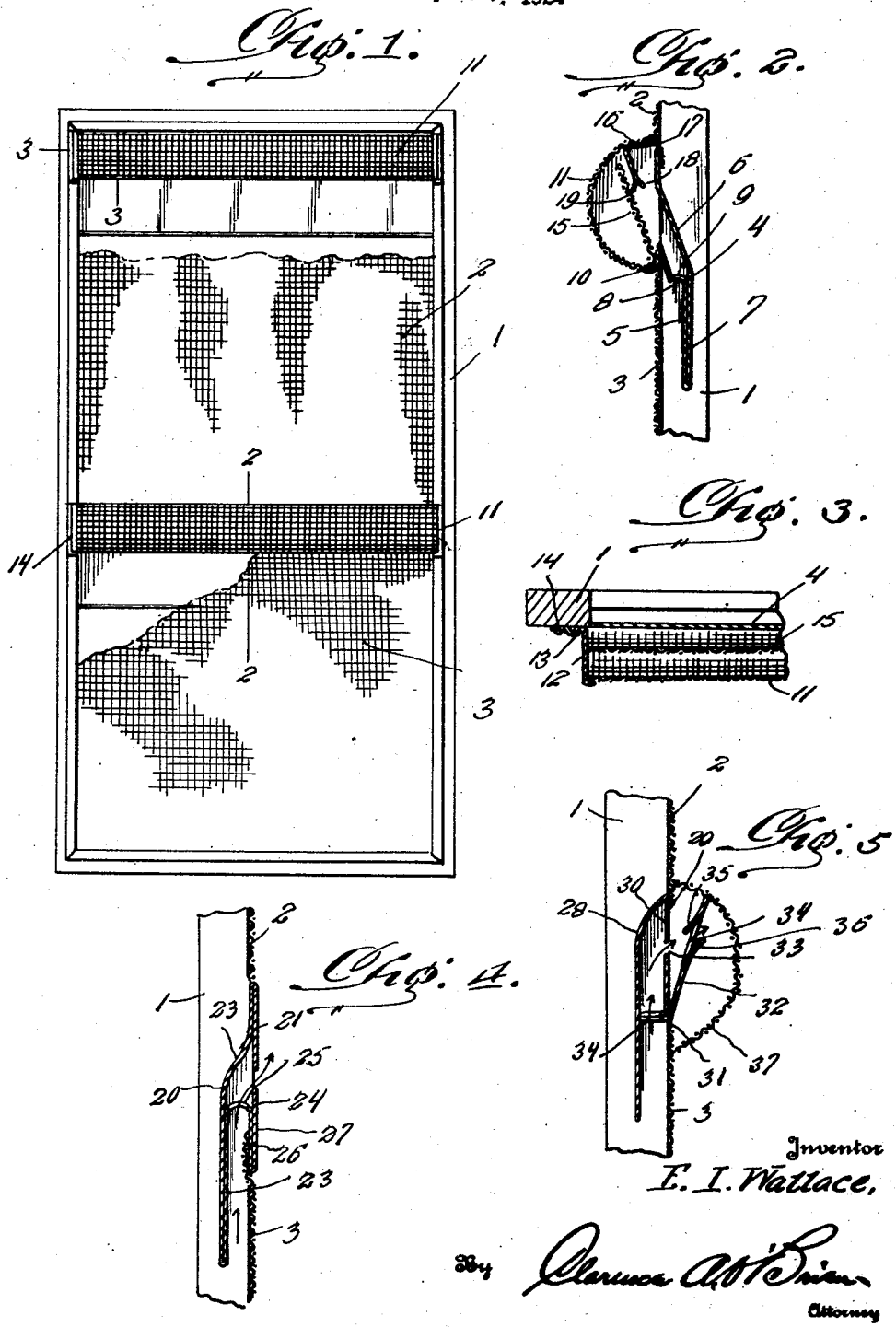
Inventor
E. I. Wallace,
By Clarence A. O'Brien
Attorney Patented Oct. 20, 1925.

1,557,909

UNITED STATES PATENT OFFICE.

EDWARD I. WALLACE, OF FLORENCE, ALABAMA.

FLY SCREEN.

Application filed April 7, 1924. Serial No. 704,793.

*To all whom it may concern:*

Be it known that I, EDWARD I. WALLACE, a citizen of the United States, residing at Florence, in the county of Laurendale and State of Alabama, have invented certain new and useful Improvements in a Fly Screen, of which the following is a specification.

This invention relates to new and useful improvements in fly screens and has for its principal object to provide a screen which may be used for doors or windows of buildings or the like, and is so constructed as to permit the escape from the building of the flies or other insects as may be on the inside, and further prevents the return of the flies or insects.

A still further object of the invention is to provide a device of the above mentioned character, wherein a trap is adapted to be associated with the fly screen and communicates with the exit provided therein whereby the flies or insects may be trapped upon leaving the inside of the building in which the screen is supported.

A still further object of the invention is to provide a fly screen of the above mentioned character, which includes a removable trap whereby the insects or flies trapped therein may be exterminated.

A further object is to provide a device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification, and in which like numerals designate like parts throughout the same:

Figure 1 is a front elevational view of my improved screen with parts broken away.

Figure 2 is a transverse section taken approximately on line 2—2 of Figure 1.

Figure 3 is a fragmentary sectional view taken on line 3—3 of Figure 1.

Figure 4 is a detail fragmentary section of a modification of a fly escape or exit, and Figure 5 is a further modification with a trap asociated therewith.

In the drawing, wherein for the purpose of illustration is shown the preferred embodiment of my invention, the numeral 1 designates the frame of my improved fly screen, the same being substantially rectangular in design and includes the usual upper and lower cross bars and the side members in the manner as clearly illustrated. Adapted to be secured to one side of the frame are the upper and lower sections 2 and 3 respectively which are formed of woven wire fabric, such as is well known in the art, and each of the sections are secured along their marginal edges to the sides and upper and lower cross bars of the frame. The free edges of the woven wire fabric sections are spaced from each other in the manner clearly illustrated in Figure 2 of the drawing, and this construction provides a means receiving the fly escape designated generally by the numeral 4.

The fly escape comprises an elongated plate which is formed of any suitable flexible metal such as tin or the like, and as is clearly illustrated in Figure 2 of the drawing, the plate 4 is bent back upon itself as illustrated at 5. The upper edge of the plate 4 is secured to the lower free edge of the section 2 of the woven wire fabric and the portion adjacent the upper end of the plate slopes downwardly as illustrated at 6 and terminates into the vertically extending portion 7 along which the bent back portion 5 extends. The upper portion of the bent back portion 5 is curved as shown at 8 and disposed in the curved portion 8 are the spaced orifices such as are shown at 9 and the same provide an exit for the purpose hereinafter to be more fully described. The curved portion 8 terminates into the upwardly extending portion 10 which is disposed substantially parallel to the sloping portion 6 and the free edge of the upwardly extending portion 10 is secured to the upper free edge of the section 3 in the manner as clearly illustrated.

The fly escape 4 will thus be arranged on the inside of the screen so that the orifices 9 in the curved portion 8 will communicate with the outside of the screen whereby the flies or insects on the inside of the screen will crawl up the section 3 and will pass outwardly through the orifices and between the sloping portions 6 and 10 and will be permitted to escape out through the screen from the inside of the building or house in the window or door of which the screen is supported.

If desired, a trap may be placed on the outside of the screen and disposed over the fly exit so as to entrap the flies or insects as they leave the exit. The trap comprises the woven wire fabric housing 11 and the same is provided with the metallic end plates 12. The end plates have suitable flanges 13 formed thereon whereby the same may be slidably supported in the cleats or guides 14 mounted on the outer faces of the side members of the frame 1. This construction is more clearly illustrated in Figure 3 of the drawing. Arranged within the housing 11 and adapted to be removably supported therein is the vestibule which comprises an elongated strip of woven wire fabric 15, the lower edge of which rests on the bottom of the trap adjacent the upper free edge of the screen section 3. The upper edge of the strip 15 is placed from the top of the housing and secured thereto adjacent the upper edge thereof is the metallic guide 16. The guide 16 is adapted to be supported in the top of the housing 11 and is further adapted to engage the free edge of the upper section 2 in such a manner as to permit the housing 11 to be removably supported thereby. In the present instance I have shown the same as hinged at 17 thereto, although it is to be understood that any suitable means may be employed for carrying out the purposes of the particular object for which the same is provided. The metallic guide is secured to the upper portion of the woven wire fabric strip 15 by having its lower edge provided with tongues 18 and 19 respectively, the tongues 18 being disposed in one direction while the tongues 19 are disposed outwardly in the opposite direction and secured to the strip 15 by solder or the like in the manner illustrated in Figure 2 of the drawing. The tongues are arranged in such a manner as to have the alternating tongues disposed in opposite direction, and the spaces formed between the tongues provide an entrance which communicates with the exit in the fly escape so that when the flies leave through the openings 9, they will pass upwardly into the housing 11 between the strip 15 and the downwardly extending portion of the guide 16 passing through the openings formed by the tongues 18 and 19 and will be entrapped in the housing between the outer portion thereof and the strip 15.

The insects thus entrapped in the housing 11 may be exterminated in any suitable manner, and the housing 11 may be removed from the screen by disengaging the upper portion of the guide member 16 from engagement with the upper section of the screen.

It is to be understood that a fly escape and trap associated therewith in the manners above described is to be placed on the fly screen adjacent the top thereof and also in the intermediate portion of the same in the manner clearly illustrated in Figure 1 of the drawing. As the description of each fly escape and trap is identical, the description of one is thought to suffice for the description of both.

In Figure 4 of the drawing I have shown a modification wherein the fly exit comprises a metallic plate 20, the upper edge of which is provided with a downwardly extending flange 21, and the same is adapted to be supported in engagement with the lower edge of the upper section 2. The plate 20 has its major portion offset from the upper end thereof in the manner shown at 22 and is bent back upon itself as shown at 23. The bent back portion 23 being disposed substantially parallel to and spaced from the lower section 3 of the screen. The intermediate portion of the bent back portion 23 is curved as shown at 24 and is provided with a number of spaced orifices such as is shown at 25 which forms an exit. The curved portion 24 terminates in a downwardly extending portion 26 and the latter has an upwardly extending portion 27 bent back upon itself. The bent back portion 27 is spaced from the downwardly extending portion 21 whereby an outlet is formed for communication with the exit openings 25. The downwardly extending portion 26 is secured to the upper edge of the section 3 of the screen. With a fly escape of the character above described, the flies or insects on the inside of the screen will be caused to pass upwardly between the depending portion of the plate 20 and the bent back portion 23 abutting the same and the screen section 3 and will pass out through the openings 25 and through the space formed between the depending portion 21 and the upwardly extending portion 27.

In Figure 5 of the drawing a still further modification is shown wherein the fly escape comprises a metallic plate 28 which is bent intermediate its ends as shown at 29 to provide a means for securing the same to the lower edge of the upper section 2. One end of the plate 28 extends downwardly on the inside of the screen and is spaced therefrom while the opposite end portion 30 extends across the space formed between the free edges of the sections and the portion thereof adjacent the lower section 3 is disposed inwardly and thence back upon itself as shown at 31. The end portion is then directed upwardly at an angle as illustrated at 32 for the purpose to be presently described. Arranged in the end portion 30 which extends between the edges of the section are the openings 33 which communicate with the openings 34 provided in the inwardly extending portion 31 and the same forms an exit for the insects on the inside of the screen. The upwardly inclined portion 32 is also provided with openings such as is shown at 31, the same being provided by forming tongues 35 and 36 in the upwardly extending portion and bending the same outwardly in opposite directions in the manner clearly illustrated.

Adapted to be removably supported on the outside of the screen and extending over the fly escape so as to enclose the upwardly extending portion 32 is the woven wire fabric housing 37. This housing forms a trap whereby the flies passing outwardly through the openings 33 to the portion 30 of the plate 28 will be caused to pass through the openings 34 in the upwardly extending portion 32 and will be entrapped in the housing between the upstanding portion 32 and the outer portion of the housing. The flies or insects thus captured by the trap may be exterminated by subjecting the same to obnoxious fumes and the insects when exterminated may be removed from the trap by disengaging the trap from its support on the screen. It is to be understood that the housing 37 is provided with end plates similar to the end plates provided with the housing 11 and the supporting means therefor.

It will thus be seen from the foregoing description, that a fly screen has been provided wherein a fly exit or escape is associated therewith for permitting flies or other insects on the inside of a building to escape and further prevent the return thereof into the building through the screen. The provision of a trap in connection with the fly escape will capture and entrap the flies passing outwardly through the fly exit and thus permit the same to be exterminated in a simple and efficient manner.

The simplicity of my device enables the same to be manufactured at a very low cost and may be installed on any screen which is used in connection with doors or windows. The parts are further so arranged as to permit ready access thereto at all times and does not require any attention after the same has been properly adjusted and placed in position on the fly screen.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A screen including a frame, an upper and a lower woven wire fabric section secured thereto, said sections having spaced free edges, a fly escape supported between the edges of said sections, said fly escape including a metallic plate bent back upon itself to provide a folded portion extending alongside of and in spaced relation to the upper portion of the lower section, the ends of said plate being secured to the respective free edges of said sections, a lateral extension formed on the upper portion of the folded portion of the plate and disposed adjacent the upper edge of the lower section, said lateral extension having an orifice formed therein providing an exit to the outside of the screen, the ends of said plate being spaced to provide an exit communicating with the aforementioned exit.

In testimony whereof I affix my signature.

EDWARD I. WALLACE.